United States Patent [19]

Lamas

[11] Patent Number: 5,042,127
[45] Date of Patent: Aug. 27, 1991

[54] RECESSED FILE RETENTION TOOL

[76] Inventor: Douglas Lamas, 3050 Curnow Rd., P.O. Box 3719 B-2 Wilson Rd., Ste. 438, Bakersfield, Calif. 93309

[21] Appl. No.: 475,924

[22] Filed: Feb. 6, 1990

[51] Int. Cl.[5] .......................... B23B 71/06; B25G 3/08; B25G 3/24
[52] U.S. Cl. ...................................... 29/80; 16/114 R; 51/205 WG; 76/83; 269/269
[58] Field of Search .................. 29/78, 80; 16/110 R, 16/114 R; 51/205 R, 205 WG; 76/82, 83

[56] References Cited

U.S. PATENT DOCUMENTS

| Re. 5,574 | 9/1973 | Stearns | 269/269 |
|---|---|---|---|
| 205,519 | 7/1878 | Ayers | 29/80 |
| 300,140 | 6/1884 | Schlumm et al. | 269/269 |
| 750,696 | 1/1904 | Price | 76/83 |
| 1,020,257 | 3/1912 | Brown | 29/80 |
| 1,057,942 | 4/1913 | Crothers | 29/80 |
| 1,335,813 | 4/1920 | Berghman | 51/205 WG |
| 2,515,469 | 7/1950 | Power | 29/80 |
| 3,820,209 | 6/1974 | Panetta | 29/80 |
| 3,914,839 | 10/1975 | Holdsworth | 29/80 |
| 4,030,382 | 6/1977 | Nilsson et al. | 76/83 |

Primary Examiner—William E. Terrell
Attorney, Agent, or Firm—I. Michael Bak-Boychuk

[57] ABSTRACT

A clamping handle assembly useful in grasping the edges of a flat file includes two handle halves joined to each other by threaded fasteners. Each of the handle halves is provided with an opposing groove within which the file is received. The groove bottoms may be longitudinally convex and concave to assure at least three points of contact with the file edges. The edges of each handle half extending beyond the grooves to serve as guides for any tool edge dressed by the file.

1 Claim, 1 Drawing Sheet

RECESSED FILE RETENTION TOOL

BACKGROUND OF THE INVENTION

1. Field of the Invention

The present invention relates to tool holding fixtures and more particularly to file holding fixtures for holding flat files.

2. Description of the Prior Art

The use of files for dressing or sharpening tool edges has had extensive application in the past. In today's setting one typically includes at least one flat file in the tool box and the file is thus an integral item of virtually all tool ensembles. Since the file is most frequently used to clean or dress long tool edges the preference is for universal flat files with the mill bastard file having the widest acceptance.

Dressing long edges with a file invariably exposes the user to injury. In typical configuration the file is a long, narrow instrument which for a straight long edge is drawn longitudinally. For example, dressing of cement finishing tools is best done with a flat file laid along the tool edge. This results in a straight edge finish desired in the tool.

In the past various holding fixtures were devised to clamp a flat file for dressing. Examples of such fixtures are shown in U.S. Pat. No. 3,914,839 to Holdsworth; U.S. Pat. No. 2,515,469 to Power; and U.S. Pat. No. 1,057,942 to Crothers. Each one of these teachings, while suitable for the purposes intended, exposes the full flat surface of the file. In consequence, the file is unguided on the edge and there is some potential of injury during use.

Clamping devices that also guide the tool edge along the file surface are therefore desired and it is one such device that is disclosed herein.

SUMMARY OF THE INVENTION

Accordingly, it is the general purpose and object of the present invention to provide a clamping handle for a flat file which includes guides for aligning the filed edge.

Other objects of the invention are to provide a split handle structure which is conveniently clamped to a flat file.

Yet further objects of the invention are to provide a handle structure for clamping to a file of various plan forms.

Briefly, these and other objects are accomplished within the present invention by providing a longitudinally split handle assembly in which the handle parts are clamped to each other by threaded fasteners. Two opposed grooves along one edge of the mating handle parts then receive the flat file. The distal edges along each groove may be coated or covered for low wear thus forming a guide for the file dressed tool.

Preferably one of the grooves is cut on a convex longitudinal groove bottom while the other groove bottom is longitudinally concave. A fore and aft threaded fastener then clamps the handle parts against the edges of the file, the convex-concave groove bottoms then assuring at least three spaced points of clamping to the file edge. In this manner files of various plan form may be clamped in the grooves.

DESCRIPTION OF THE PREFERRED EMBODIMENT

Figure 1:
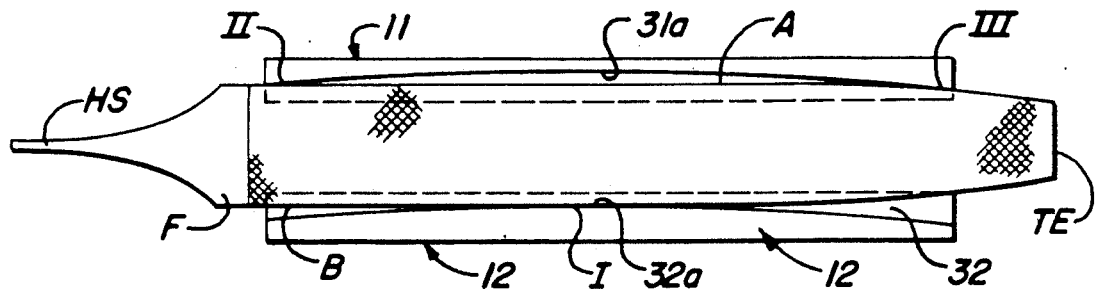
FIG. 1 is a plan view of a conventional flat file clamped within the shaped grooves of the present invention.
Figure 2:
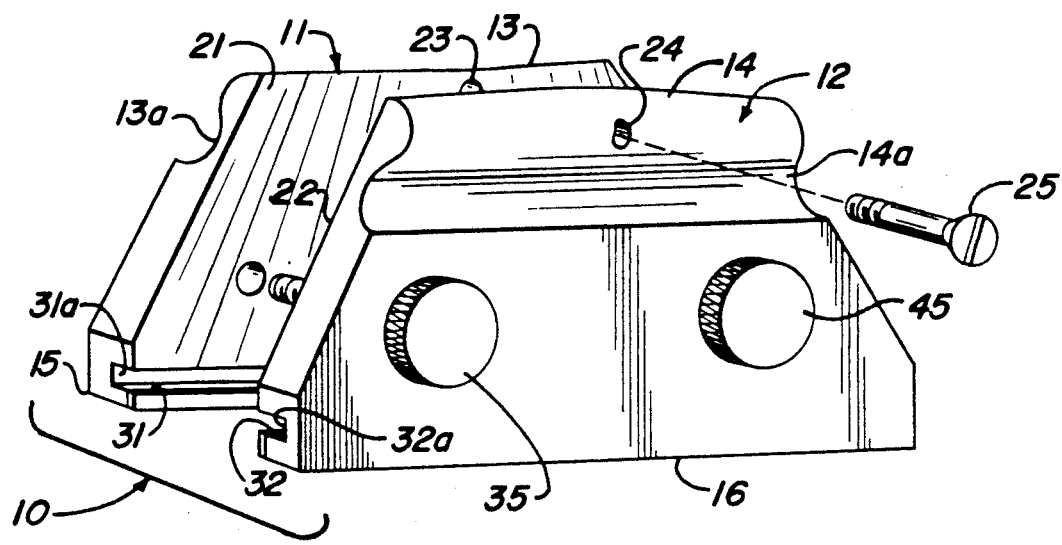
FIG. 2 is a perspective illustration, separated by parts, of the inventive file clamping handle.
Figure 3:
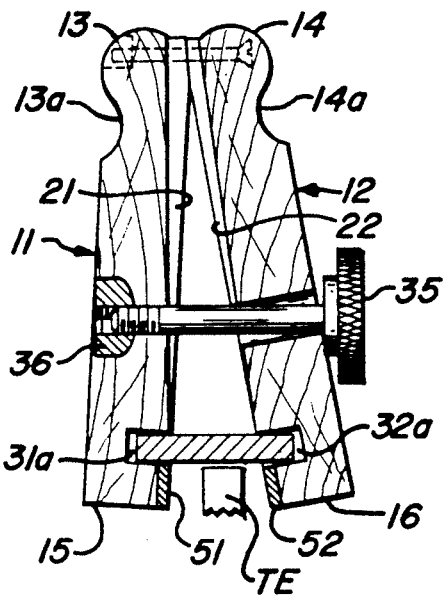
FIG. 3 is a sectional end view of the inventive file clamping handle.

As shown in FIG. 1 a prior art file F is characterized by a handle spike HS at one end and a truncated transverse edge TE at the other end. Between these ends the plan form of the file is defined by its lateral edges A and B. Although generally elongate the edges defining the file planform are not exactly straight or parallel, the preferred configuration entailing slightly curved edges. The amount of edge curvature and the length of the file often vary from manufacturer to manufacturer. Thus, any clamping fixture clamping the edges A and B must achieve at least a three point contact to hold the file in a clamped plane.

To achieve this three point contact I have devised a clamping handle, generally shown by the numeral 10, comprising a first handle portion 11 and a second handle portion 12. As illustrated in FIGS. 1-4 portions 11 and 12 are each generally planar in form, each defined by a corresponding upper rounded edge 13 and 14 and elongate lower edges 15 and 16. Each of the portions 11 and 12, moreover, may include a corresponding depression 13a and 14a adjacent the rounded edges for manual grasping.

The opposed faces 21 and 22 of the handle portions are generally raised at the center of each edge 13 and 14, each including at the raised center a coaxial drilling 23 and 24. A threaded fastener 25 extends through drillings 23 and 24 to engage a threaded insert 26 at the other end. Fastener 25 is thus useful to bring the surfaces 21 and 22 towards each other.

Proximate the lower edges 15 and 16 each of the faces 21 and 22 includes a transverse groove 31 and 32, groove 31 including a generally concave groove bottom 31a while groove 32 including a convex groove bottom 32a. Preferrably the curvature of groove bottoms 31a and 32a is greater than the curvatures of the file edges A and B.

Thus, when the file F is received within grooves 31 and 32 essentially a three point contact is effected between the groove bottoms 31a and 32a and the edges of the file (shown in FIG. 1 at I, II and III). In this manner further clamping of the handle portions 11 and 12 fixes the plane of the file therebetween. This clamping may be further effected by two threaded posts 35 and 45 extending through handle portion 12 into corresponding threaded inserts 36 and 46 formed in portion 11. Posts 35 and 45 may include knurled fixing knobs 35a and 45a at their exposed ends for manipulative convenience.

The opposed surfaces 21 and 22, between each groove and the corresponding edge 15 and 16, may be lined with metal (or other low wearing) covers 51 and 52. These covers then guide the edge of a tool TL therebetween as it is moved over the face of the file F.

In this manner a file handle is devised which holds files of various planforms and which, further acts as a guide for any tool edge passed over the file.

Obviously many modifications and changes may be made to the foregoing description without departing from the spirit of the invention. It is therefore intended that the scope of the invention be determined solely on the claims appended hereto.

What is claimed is:

1. A handle assembly useful in clamping the edges of a flat file, comprising:
    a first substantially planar handle portion defined by one substantially straight edge, said first portion including a first inner face provided with a first raised bearing surface distal of said one straight edge;
    a second substantially planar handle portion of a plan form substantially equal to said first handle portion, said second portion including a second inner face provided with a second raised bearing surface aligned for opposition against said first raised bearing surface;
    engagement means extending through said first and second raised bearing surface for connecting said first and second portions to each other in opposed bearing alignment at said first and second bearing surfaces;
    a first and second elongate groove formed in said first and second portions said first groove being aligned adjacent said straight edge;
    fastening means connected between said first and second portions, distal of said engagement means for advancing said first groove into opposition to said second groove, said fastening means including a first and second threaded fastener;
    said first groove including a substantially longitudinally convex groove bottom and said second groove including a substantially longitudinally concave groove bottom; and
    said first and second portions each include a guiding extension projecting adjacent said first and second grooves.

* * * * *